(12) United States Patent
Stolarz et al.

(10) Patent No.: US 7,302,936 B2
(45) Date of Patent: Dec. 4, 2007

(54) LINE SYSTEM FOR FLUIDS HAVING VOLATILE COMPONENTS

(75) Inventors: Alex Stolarz, Bonaduz (CH); Ralph Kettl, Paspels (CH); Andre Sturzel, Igis (CH)

(73) Assignee: EMS-CHEMIE AG, Domat/EMS (CH)

( * ) Notice: Subject to any disclaimer, the term of this patent is extended or adjusted under 35 U.S.C. 154(b) by 0 days.

(21) Appl. No.: 11/387,760

(22) Filed: Mar. 24, 2006

(65) Prior Publication Data

US 2006/0236979 A1    Oct. 26, 2006

(30) Foreign Application Priority Data

Mar. 24, 2005    (CH) ..................... 0582/05

(51) Int. Cl.
*F02M 55/02*    (2006.01)
*F02M 55/00*    (2006.01)
(52) U.S. Cl. ..................... 123/468; 138/114
(58) Field of Classification Search ............ 123/468, 123/469, 198 D, 456; 138/111–117, 148; 428/188; 156/244.13, 244.15
See application file for complete search history.

(56) References Cited

U.S. PATENT DOCUMENTS 5,076,242 A * 12/1991 Parker ................. 123/514
5,611,373 A *  3/1997 Ashcraft .............. 138/113
6,032,699 A *  3/2000 Cochran et al. ....... 138/104

(Continued)

FOREIGN PATENT DOCUMENTS

EP    0 264 102 B1    10/1991

(Continued)

OTHER PUBLICATIONS

Final Draft submitted for Recognition as an American National Standard, "Nonmetallic Fueld System Tubing With One or More Layers", SAE Standard, Oct. 1, 2003.

(Continued)

*Primary Examiner*—Mahmoud Gimie
(74) *Attorney, Agent, or Firm*—Browdy and Neimark, PLLC

(57) ABSTRACT

A line system (1) for fluids having volatile components, which comprises at least one fluid line (2,3,4), each having a separate inlet (10) and outlet (11), the fluid lines (2,3,4) being enclosed by a first line wall (12) and extending jointly over a section (A) of the line system (1) close-fitting to one another, but being separated from one another at least by the first line wall (12) over the entire length of the fluid lines (2,3,4). The line system (1) is implemented as a plastic hollow profile at least over the section (A) and comprises a further fluid line (8), which is enclosed by a second line wall (13), and comprises one or more line chambers (8",8"'), which are at least partially separated from one another by support webs (7), whose totality at least essentially encloses the fluid lines (2,3,4). In addition, the first and second line walls (12,13) and the support webs (7) of the plastic hollow profile being implemented from the same polymer material. The line system (1) according to the present invention is characterized in that the further fluid line (8) is implemented as a scavenging line (8) having scavenging chambers (8", 8"') and is connected to a scavenging device, which is implemented for flushing or suctioning the scavenging line (8) and therefore for conveying away and collecting permeates originating from the fluid lines.

29 Claims, 2 Drawing Sheets

U.S. PATENT DOCUMENTS 6,328,074 B1    12/2001  Wright et al.
7,156,126 B2 *  1/2007   Topek et al. ................ 138/117

FOREIGN PATENT DOCUMENTS

| EP | 0 635 670 B1 | 1/1995 |
| EP | 1 150 006 A2 | 10/2001 |
| EP | 1 469 188 A1 | 10/2004 |
| FR | 2 697 892 A1 | 5/1994 |
| GB | 2 290 848 A | 1/1996 |
| WO | WO 94/10491 A1 | 5/1994 |

OTHER PUBLICATIONS

Renault, Product Specification, "Lines for Fuel Circuits", Normalisation Renault Automobiles, 34-04-892/—C, pp. 1-55, 2000.

* cited by examiner

LINE SYSTEM FOR FLUIDS HAVING VOLATILE COMPONENTS

RELATED APPLICATIONS

This patent application claims priority of the Swiss patent application No. CH 2005 00582/05 filed on Mar. 24, 2005.

FIELD OF TECHNOLOGY

According to a first aspect, the present invention relates to a line system for fluids having volatile components, which comprises at least one fluid line having a separate inlet and outlet, the fluid lines being enclosed by a first line wall and extending jointly over a section A of the line system close-fitting to one another, but being separated from one another over the entire length of the fluid lines at least by the first line wall, the line system being implemented at least over the section A as a plastic hollow profile and comprising a further fluid line, which is enclosed by a second line wall and comprises one or more line chambers at least partially separated from one another by support webs, whose totality essentially encloses the fluid lines, and the first and second line wall and the support webs of the hollow plastic profile being implemented from the same polymer material.

According to a second aspect, the present invention relates to those line systems which are situated between a fuel container or a fuel tank and an internal combustion engine or a motor of a motor vehicle, particularly an automobile, the fluid lines comprising at least one line which is selected from a group which comprises flow lines, return lines, and ventilation lines. According to a third aspect, the present invention relates to those line systems which are implemented as a fuel line system leading to and/or away from a fuel tank, the fluid lines comprising at least one line which is selected from a group comprising transport lines, filling lines, tapping lines, and ventilation lines. Very generally, the line system according to the present invention is especially suitable for transporting environmentally harmful, poisonous, or flammable fluids having volatile components, because permeates which penetrate the walls of the line system are prevented in all cases from being able to reach the environment.

The present invention is explained in the following on the basis of the example of fuel line systems for gasoline engines. This example is selected as representative of further examples, such as fuel line systems for diesel engines or fuel cells, fuel transport lines for buried or movable tank facilities, fluid lines for explosive gases or combustible liquids and the like, and is not to narrow the scope of the present invention.

RELATED PRIOR ART

In modern fuel injection systems of automobiles, a fuel pump is used for conveying the fuel, i.e., the gasoline or the diesel fuel, in the quantity required for the particular injection system and at the pressure required for this purpose from the fuel tank to the injection valve or to the injection pump. Current fuel pumps are usually electrically driven and are typically located in the fuel tank.

Fuel line systems for gasoline engines currently predominantly comprise plastic pipes. The pressure in such fuel line systems is typically up to 4.5 bar in the flow line, which leads from the fuel pump in the gasoline tank to the engine, and up to 0.5 bar in the return line, which returns excess unused fuel from the engine to the gasoline tank. The internal diameter of such flow lines is approximately 3 to 12 mm at a wall thickness of 1 to 1.5 mm. The internal diameter of such return lines is approximately 6 to 18 mm at a wall thickness of 1.5 to 2.0 mm. Leakage collection lines having diameters of 3 to 6 mm and wall thicknesses of 0.8 to 1.5 mm may also be implemented in such a way. Fuel line systems known from the related art additionally comprise ventilation lines for removing or collecting gasoline gases or gasoline vapors and possible gasoline condensates at a pressure of at most 0.2 bar (cf. "NONMETALLIC FUEL SYSTEM TUBING WITH ONE OR MORE LAYERS" in: PRELIMINARY COPY OF THE FINAL DRAFT OF THE STANDARD AS SUBMITTED FOR RECOGNITION AS AN AMERICAN NATIONAL STANDARD; November 1996 edition). Such ventilation lines usually connect at least the ventilation system of the gasoline tank and/or the activated carbon filter via a regeneration line to the intake system of the engine. The ventilation line connected to the intake system of the internal combustion engine of an automobile collects the vapors accumulated in the gasoline tank and supplies these through the ventilation lines either to the intake system of the engine (when the engine is running), or otherwise to the activated carbon filter for temporary storage. The latter case occurs above all when the vehicle has not been used for a long time and, in particular, when the heating of the vehicle by solar radiation, for example, favors permeation of the fuel through the lines. If the vehicle is put into operation again (i.e., the engine is started again), the activated carbon filter is regenerated using the fresh air suctioned in by the engine. The gasoline vapors released at the same time are conducted via the regeneration line to the intake area of the engine, where they are combined with the fuel/air mixture and supplied to the engine for combustion.

The present invention also relates to fuel line systems for internal combustion engines which do not have a return line, i.e., fuel line systems which only comprise a flow line for the fuel and a ventilation line for the fuel vapors.

The pressure values cited are also approximately maintained by European firms, it is thus disclosed in the product specifications of RENAULT (Nr. 34-04-892/-C; Normalisation Renault Automobiles, Service 65810, Section Normes et Cahiers des Charges, RENAULT 2000) that the flow lines are operated at a pressure of 3.5 bar, and the return lines and ventilation lines are operated at a pressure of 0.5 bar.

These plastic pipes for conducting fuel typically comprise a barrier layer or multiple barrier layers made of a special barrier material (e.g., made of a fluoropolymer), which limits the permeation of the fuel conveyed in this line through the pipe wall and therefore any fuel emissions to the environment. An essential disadvantage of the fuel line systems known from the related art is the often complex multilayer structure of the lines used, sometimes having costly polymers. In addition, the difficulty exists of producing good adhesion of different types of polymer layers with one another (often using adhesion promoting layers), in order to prevent delamination of the polymer layers. In spite of using such barrier layers, however, fuel permeation through the walls of the plastic pipes used cannot be prevented completely, because a diffusion, if only a very slight, of hydrocarbon molecules through the pipe wall always occurs with the barrier plastics. Such fuel permeation is to be observed above all from the flow line, and is favored by the pressure of multiple bar existing here. In addition, when the engine of previously driven vehicles is turned off, an increased permeation rate caused by temperature (the "hot soak" phase) occurs, since the circulation of the gasoline occurring due to the operation of the vehicle is lacking, and therefore locally higher temperatures may occur.

"Common rail" injection systems for diesel engines are known. Significantly higher pressures of up to 1800 bar are used in the flow line of the fuel line system therein. Currently, an increase of the injection pressure to 2000 bar and more is even being worked on. Thus, EP 1 469 188 A1 and EP 1 150 006 A2 disclose such diesel injection systems having a double-walled fuel line, which connects the injection points of the "common rail" injection system to one another and to the high-pressure pump. In this case, an internal high-pressure line made of metal conveys the diesel fuel from the high-pressure pump to the injection nozzles. A low-pressure line enclosing the high-pressure line, which is also made of metal, is used for returning unused fuel and helps to reduce the escape of fuel if the high-pressure line bursts. In addition, the low-pressure line is monitored for faulty pressure increases, which indicate a leak in the high-pressure line.

A fuel line system, in which the flow line and the return line jointly form a double pipe, the flow line under high pressure again being situated as the internal pipe within the external pipe forming the return line, is also known from DE 296 10 374. Only the return line formed by the external pipe here is to be secured against fuel diffusion, while this is not necessary for the flow line formed by the internal pipe, since this is enclosed by the return line. For this purpose, the internal pipe and/or the external pipe may comprise a metal or plastic profile. The external pipe made of plastic preferably has a diffusion barrier on its inside.

It is also known from the product specifications of RENAULT that the flow lines (up to the high-pressure injection pump located in direct proximity to the engine) and the return lines for diesel fuel may also be operated at a pressure of 0.5 bar. Diesel engines generally do not have a ventilation line.

Fuel line systems according to the species for internal combustion engines, which comprises a flow line, a return line, and a ventilation line, are known from WO 94/10491. A first embodiment discloses a fuel line system which is implemented as a one-piece plastic hollow profile comprising both flow line and also return line and ventilation line over a section shared by these lines. This embodiment has the disadvantage of always requiring a multilayered plastic pipe to be used for the ventilation line, so that the fuel emission to the environment may be reduced. A second embodiment discloses a fuel line system, in which the ventilation line at least approximately encloses both the flow line and also the return line in the area of a section shared by these lines. This embodiment has the disadvantage that this fuel line system must be produced in at least two parts and subsequently pushed one into another, a multilayered plastic pipe also being used for the ventilation line.

A line for transporting fluids, such as fuel in motor vehicles, is known from GB 2 290 848 A. in this case, two or more concentric lines transport the fuel from the fuel tank to the engine and also in the reverse direction. The internal line is supported by longitudinal webs. The outermost line conducts fuel vapors from the fuel tank into a gas tank and provides a significant reduction of the overall permeability of the multiple lines extruded from a plastic material. U.S. Pat. No. 6,328,074 B1 also discloses a fuel line extruded from a plastic material having an integrated leakage line. An inert gas is pumped into this leakage line, so that any existing fuel vapors are guided to a distal leak detector and may be detected there.

OBJECTS, SUMMARY AND ADVANTAGES OF THE PRESENT INVENTION

The object of the present invention is to suggest an alternative line system for fluids having volatile components, which is simple to produce and whose use eliminates or at least limits to a minimum any fuel vaporization emissions to the environment, without multilayered plastic pipes having to be used.

This object is achieved according to a first aspect of the present invention, in that a line system for fluids having volatile components is suggested, which comprises at least one fluid line having a separate inlet and outlet, the fluid lines being enclosed by a first line wall and extending jointly over a section A of the line system close-fitting to one another, but being separated from one another by at least the first line wall over the entire length of the fluid lines. The line system is implemented as a plastic hollow profile at least over the section A and comprises a further fluid line, which is enclosed by a second line wall and comprises one or more line chambers at least partially separated from one another by support webs, whose totality essentially encloses the fluid lines. In addition, the first and second line walls and the support webs of the plastic hollow profile are implemented from the same polymer material. The line system according to the present invention is distinguished in that the further fluid line is implemented as a scavenging line having scavenging chambers and is connected to a scavenging device, which is implemented for flushing or suctioning the scavenging line and therefore for conveying away and collecting permeates originating from the fluid lines.

Preferred refinements of the line system according to the present invention and further inventive features will be described below.

The line system according to the present invention comprises the following advantages:

The gasoline vapors exiting through the fluid line walls (e.g., from the flow line, return line, and ventilation line) via permeation are continuously collected in the scavenging line and permanently supplied to the fuel (aeration and) ventilation system of the vehicle (to the intake area of the engine or the activated carbon filter, depending on the operating state).

The scavenging line may also be used as a ventilation line or as a regeneration line.

If the scavenging line of the plastic hollow profile is permanently flushed with a liquid and/or a gas and/or suctioned through partial vacuum, the requirement of a multilayered outer wall is dispensed with.

To increase the safety, the outer wall of the plastic hollow profile, which is simultaneously also the second line wall enclosing the scavenging line, may be provided with an additional barrier layer. Because the permeation of gasoline vapors is much less than the permeation of liquid gasoline, this outermost line may be sealed by the outer wall with less complexity and/or better against permeation of fuels.

The outer wall of the plastic hollow profile may be implemented as an at least partially corrugated pipe. The flexibility of the profile may thus be increased at a given diameter, and the mechanical properties, such as transverse pressure resistance of the profile, are improved.

All lines are integrated in a single plastic hollow profile, which may be laid simply as a single line and attached to the vehicle. This reduces the mounting costs and the possibility of connection errors; in addition, the overview of the mounted parts is improved.

BRIEF INTRODUCTION OF THE DRAWINGS

In the following, the present invention is explained in greater detail on the basis of exemplary, schematic figures, which are only to clarify the scope of the present invention, but are not to restrict it.

DETAILED DESCRIPTION OF THE INVENTION

Figure 1:
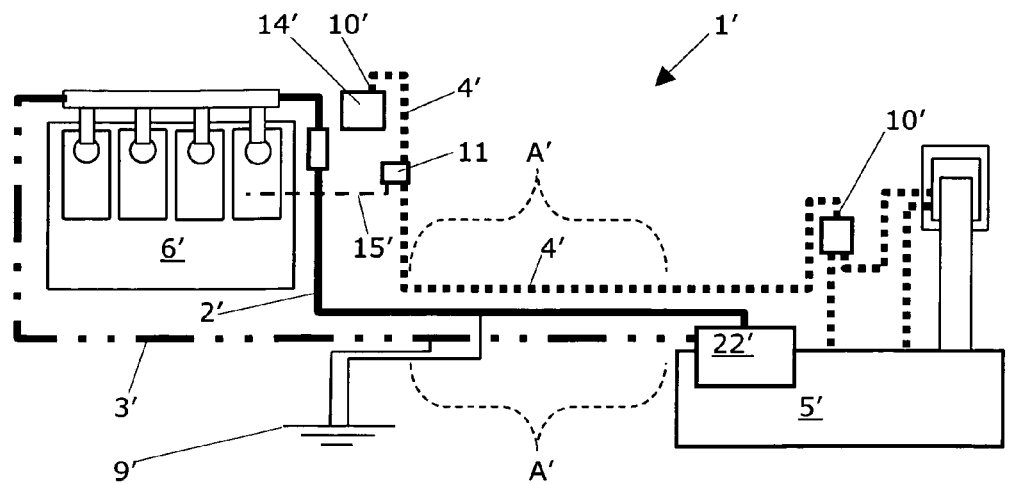
FIG. 1 shows a diagram of a fuel line system known from the related art in an automobile.

FIG. 1 shows a fuel line system known from the related art in an automobile in a strongly schematic illustration, which essentially corresponds to FIG. 1 of WO 94/10491. The line system 1' for fluids having volatile components is implemented here as a fuel line system, which comprises at least one fluid line in the form of a flow line 2', a return line 3', and a ventilation line 4', each having a separate inlet 10' and outlet 11'. These fluid lines 2',3',4' are each enclosed by a first line wall and extend jointly over a section A' of the line system 1 more or less close-fitting to one another; but they are separated by at least the first line wall over the entire length of the fluid lines 2',3',4'. It was already recognized in WO 94/10491 that these fluid lines 2',3',4' may be combined in the section A' into one component, so that they extend over this section A' of the line system 1' close-fitting to another, but are separated from one another by at least the first line wall over the entire length of the fluid lines 2',3',4'.

The ventilation line 4' connected to the intake system 15' of the internal combustion engine 6' of the automobile collects the vapors accumulated in the fuel container 5' and guides these through the ventilation lines 4' either to the intake system 15' (while the engine runs), or otherwise to the activated carbon filter 14' for temporary storage (adsorption). After starting and during operation of the vehicle, the activated carbon filter 14' is regenerated using the fresh air taken in by the engine. The gasoline vapors which are released again at the same time are conducted via the regeneration line 15' to the intake area of the engine 6', where they are combined with the fuel/air mixture and supplied to the engine for combustion. Therefore, the ventilation line 4' or the ventilation system has one or more inlets 10', through which fuel vapors may reach the ventilation system or the ventilation line. In addition, the ventilation line 4' or the ventilation system has an outlet 11', through which fuel vapors may leave the ventilation system without reaching the environment. In this case, the activated carbon filter 14' of the suction unit 15' or regeneration line situated at the outlet 11' of the ventilation line 4' at least temporarily traps the fuel vapors (particularly during shutdown times of the engine).

Figure 2:
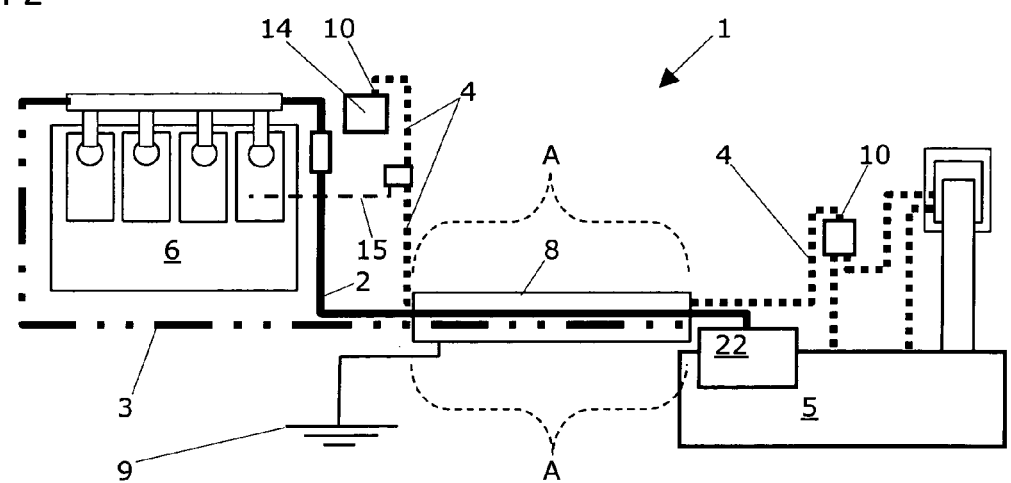
FIG. 2 shows a diagram of a fuel line system according to the present invention in an automobile, the cross-section corresponding to FIG. 5.

FIG. 2 shows a diagram of an exemplary fuel line system according to the present invention in an automobile. The line system 1 for fluids having volatile components is implemented here as a fuel line system, which comprises at least one fluid line in the form of a flow line 2, a return line 3, and a ventilation line 4, each having a separate inlet 10 and outlet 11. In this section A, essentially between the fuel pump 22, which is at least partially situated in the fuel container 5, and the regeneration line 15, the flow line 2 and the return line 3 extend jointly and close-fitting to one another. The fluid lines 2 and 3 are separated from one another at least by a first line wall 12, however, and a scavenging line 8 is situated around these two fluid lines 2, 3 (cf. FIGS. 5A, 5B). This scavenging line 8 is connected their ends to the ventilation system 4 and is thus also used as a ventilation line in the section A.

Figure 3:
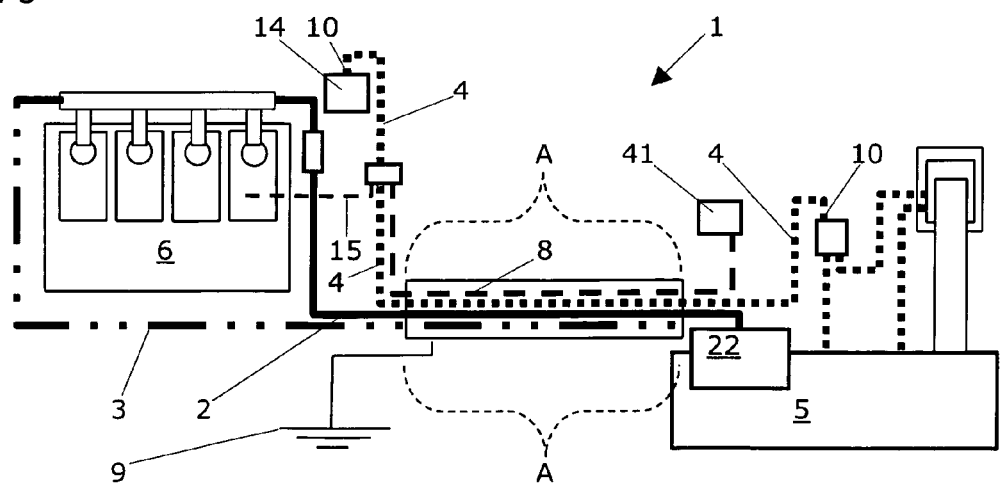
FIG. 3 shows a diagram of a fuel line system according to the present invention in an automobile, the cross-section corresponding to FIGS. 6 through 9.

FIG. 3 shows a diagram of an exemplary fuel line system according to the present invention in an automobile. The line system 1 for fluids having volatile components is implemented here as a fuel line system, which comprises at least one fluid line in the form of a flow line 2, a return line 3, and a ventilation line 4, each having a separate inlet 10 and outlet 11. In this section A, essentially between the fuel pump 22, which is situated at least partially in the fuel container 5, and the regeneration line 15, the flow line 2, the return line 3, and the ventilation line 4 extend jointly and close-fitting to one another. The fluid lines 2, 3, and 4 are separated from one another by at least a first line wall 12, however, and a scavenging line 8 is situated around these three fluid lines 2, 3, 4 (cf. FIGS. 6 through 9). This scavenging line 8 is connected at its other end to an activated carbon filter 41 and/or to the regeneration line 15 of the automobile and is thus also used in section A as a regeneration line.

Figure 4A:
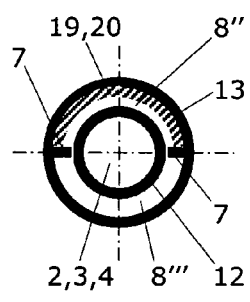
FIG. 4 shows a flexible (FIG. 4A) and a stable (FIG. 4B) cross-section through the simplest, first embodiment of a line system according to the present invention.
Figure 4B:
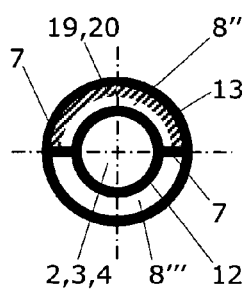

FIG. 4 shows a cross-section through the simplest, first embodiment of a line system 1 according to the present invention, which is implemented at least over the section A as a plastic hollow profile and comprises a scavenging line 8, which is enclosed by a second line wall 13. This scavenging line 8 comprises two scavenging chambers 8", 8'" here, which are separated from one another by support webs 7. The totality of these scavenging chambers 8", 8'" essentially encloses the fluid line 2,3,4. If one views the volume of the support webs 7 as belonging to the volume of the scavenging line 8, and particularly if (as shown in FIG. 4A) the first line wall 12 is separated from the support webs 7, the scavenging line 8 completely encloses the fluid line 2,3,4. This separation of the support webs 7 from the first line wall 12 is particularly preferred if greater flexibility of the plastic hollow profile is desired, for example, for thermoforming or laying on an automobile. Instead of running linearly and essentially parallel to the longitudinal axis of the plastic hollow profile, the support webs may also run in a spiral, if the manufacturing behavior allows this possibility.

The reference numbers 2,3,4 indicate here that this fluid line may be used for transporting arbitrary fluids having volatile components, i.e., for example, as a flow line, return line, or ventilation line in a fuel line system for internal combustion engines. This simple fluid line 2,3,4 may also be implemented as a transport line, filling line, tapping line, or ventilation line in a fuel line system, however, which is implemented as a leading to or from a stationary (e.g., buried or walled-in) or movable (e.g., mounted on a truck or railway car) tank facility. This simple fluid line 2,3,4 is always enclosed by a scavenging line 8, so that the permeates originating from the fluid lines 2,3,4 may be conveyed away through suction and/or using a scavenging fluid. Such a scavenging fluid may be a gas, such as air. If no special flexibility of the plastic hollow profile is necessary or if increased stability is even desired, the plastic hollow profile is produced in one piece (cf. FIG. 4B).

If the permeate is explosive, the scavenging fluid may also be a liquid (e.g., water) or a chemically inert gas (such as nitrogen gas). It is important in cases using non-inert scavenging fluids (e.g., air), that the occurrence of a critical concentration is avoided in the plastic hollow profile, or at least in the scavenging line. Above all, however, critical or harmful concentrations are not to reach the environment. In the following, examples of explosive limits of different materials are specified for explanation:

TABLE 1

| Material | Lower explosive limit in mixture with air [vol. %] | Upper explosive limit in a mixture with air [vol. %] |
| --- | --- | --- |
| Acetylene | 1.5 | 82 |
| Ammonia | 15 | 28 |
| Gasoline | 0.6 | 8 |
| Natural gas | 4.5 | 13.5 |
| Carbon monoxide | 12.5 | 75 |
| Methane | 5 | 15 |
| Petroleum | 0.7 | 5 |
| Propane | 2.1 | 9.5 |
| Carbon disulfide | 1 | 60 |
| Hydrogen | 4 | 75.6 |

In general, the larger the explosive range, the more dangerous dealing with this material is, of course. Acetylene is explosive in almost any concentration (from the homepage "fire education" of the Flensburg-Tarup Volunteer Fire Department).

The device for flushing or suctioning the scavenging line 8 and therefore for conveying away and collecting permeates originating from the fluid lines is preferably a partial vacuum source connected to the outlet 11 of the scavenging line 8 or an overpressure source connected to the inlet 10 of the scavenging line 8. Such partial vacuum sources may be suction pumps (or the air intake system of the engine in automobiles), for example. For example, pressure pumps or compressed gas bottles may be used as overpressure sources. If such a plastic hollow profile is used in an automobile, the inlet 10 of the scavenging line 8 may be connected to an adsorbing unit 14 (e.g., an activated carbon filter), which at least temporarily bypasses and/or buffers a suction unit 15 situated at the outlet 11 of the scavenging line 8, e.g., the regeneration line leading to the intake system of the engine, (particularly during engine shutdown times), in order to trap permeate vapors.

It is especially preferable for the scavenging line 8 of the plastic hollow profile to be permanently suctioned by connection to partial vacuum and/or to be permanently flushed using a liquid and/or a gas. Fluids transported in such simple lines may therefore be the fluids cited in Table 1, inter alia, but heating oil and other fuels or diesel oil or other fuels may also be conveyed. Fluid energy carriers selected from the group of gasoline, diesel, ethanol, methanol, methane, and hydrogen are preferred. In motor vehicles, additional devices, such as pumps, ventilators, and the like, may be provided for moving the gases and/or vapors present in the scavenging lines when the engine is turned off.

Figure 5A:
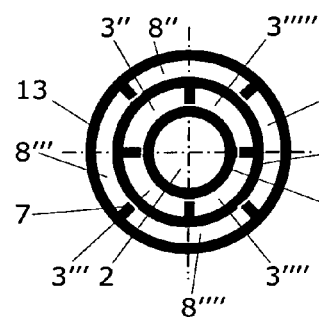
FIG. 5 shows a flexible (FIG. 5A) and a stable (FIG. 5B) cross-section through the flow and return lines of a line system according to the present invention, according to a second embodiment shown in FIG. 2.
Figure 5B:
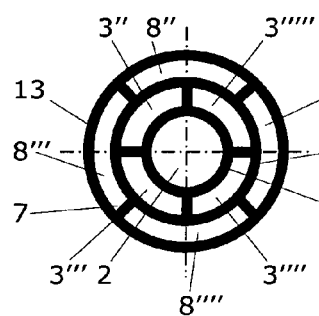

FIG. 5 shows a cross-section through the flow and return lines of a line system according to the present invention, according to a second embodiment. This is a line system 1 for fluids having volatile components, which comprises at least one fluid line (a flow line and a return line 2,3 here), each having a separate inlet 10 and outlet 11. These fluid lines 2,3 are enclosed by a first line wall 12 and extend—close-fitting to one another—jointly over a section A of the line system 1. The two fluid lines 2,3 are separated from one another at least by the first line wall 12 over their entire length. The two fluid lines 2,3 are enveloped by an intermediate wall 21. The cross-section shows that the line system 1 is implemented at least over the section A as a plastic hollow profile and comprises a scavenging line 8 situated around the intermediate wall 21. This scavenging line 8 is enclosed by a second line wall 13 and comprises one or more (four here) scavenging chambers 8", 8'", 8"", 8""', which are at least partially separated from one another by support webs 7. The totality of these scavenging chambers essentially encloses the fluid lines 2,3. Four support webs 7 are indicated here in the area of the return line 3 and in the area of the scavenging line 8; notwithstanding this example, more or less support webs may also be provided, but at least two support webs 7 per line. If (as shown in FIG. 5A) the first line wall 12 is separate from the support webs 7, a greater flexibility of the plastic hollow profile for thermoforming or for laying on an automobile is achieved. For exclusively linear hollow profiles having increased strength (e.g., for lines leading to or from tank facilities), in contrast, the plastic hollow profile is preferably produced in one piece (cf. FIG. 5B).

Figure 6A:
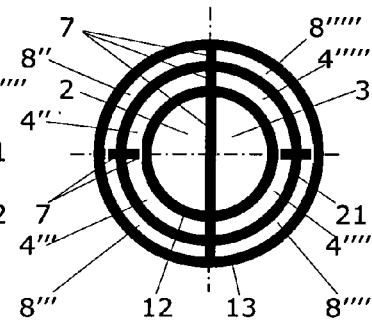
FIG. 6 shows two horizontal flexible (FIGS. 6A,6B) cross-sections through the flow, return, and ventilation lines of a line system according to the present invention, according to a third embodiment shown in FIG. 3.
Figure 6B:
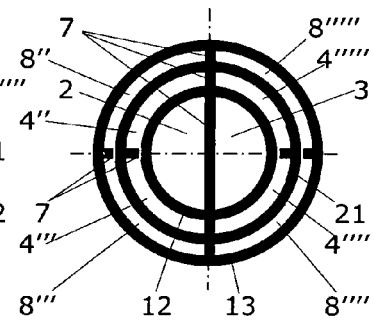

FIG. 6 shows a cross-section through the flow, return, and ventilation lines of a line system according to the present invention, according to a third embodiment. In contrast to FIG. 5, here a ventilation line 4 is additionally situated concentrically, i.e., coaxially to the two fluid lines jointly forming a circular cross-section with the first wall 12. These fluid lines are identified here as the flow line 2 and as the return line 3 and are separated from one another by a support web 7. A ventilation line 4, comprising four line chambers 4",4'", 4"", 4""', is situated around these fluid lines 2,3 and is delimited using an intermediate wall 21. All fluid lines 2,3,4 of the line system 1, which is implemented as a plastic hollow profile at least over the section A and comprises a scavenging line 8, are essentially enclosed by the scavenging line 8 and/or its scavenging chambers 8",8'",8"", 8""', which are separated from one another by support webs 7. As shown in FIG. 6A, the first line wall 12 may be partially separated from the support webs 7. Greater flexibility of the plastic hollow profile for thermoforming or laying on an automobile is again thus achieved. However, the flexibility of the plastic hollow profile around the horizontal axis is restricted by the support web 7, which is shown vertically here. In order to allow or improve flexibility in relation to the vertical axis, the horizontal holding webs 7 situated on the intermediate wall 21 are preferably separated from the first line wall 12 and from the second line wall 13 (cf. FIG. 6A). Alternatively, with the same result, the horizontal support webs 7 may also always only be connected to the particular adjoining outer wall (cf. FIG. 6B). For exclusively linear hollow profiles having increased strength (e.g., for lines leading to or from tank facilities), in contrast, the plastic hollow profile is preferably produced in one piece (cf. FIG. 5B).

Figure 7:
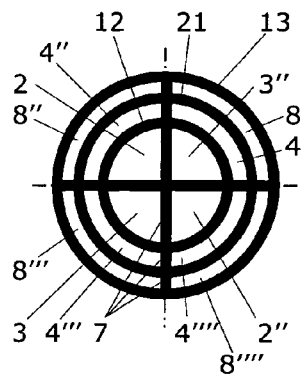
FIG. 7 shows a stable cross-section through multiple flow, return, and ventilation lines of a line system according to the present invention, according to a fourth embodiment.

FIG. 7 shows a cross-section through multiple flow, return, and ventilation lines of a line system according to the present invention, according to a fourth embodiment. In contrast to FIG. 6, the two central fluid lines, flow line 2 and return line 3, are divided here, so that four central fluid lines 2,2",3,3" and an annular fluid line 4, which encloses them, having line chambers 4",4"',4"",4""', arise. The fluid lines 2,2" and 3,3" are separated from the fluid line 4 by an intermediate wall 21. All fluid lines 2,3,4 of the line system 1, which is implemented as a one-piece plastic hollow profile at least over the section A and comprises a scavenging line 8, are essentially completely enclosed by the scavenging line 8 and/or its scavenging chambers 8",8"',8"",8""', which are separated from one another by support webs 7. The support webs 7, which are connected on all sides to the adjoining walls, cause good stability of the plastic hollow profile. If this plastic hollow profile is to have a planned final shape which deviates strongly from a straight line, the support webs 7 may be produced at a distance to a particular adjoining wall (cf. FIG. 6), so that the originally linearly extruded hollow profile may be bent into shape after reheating through thermoforming. Alternatively, such plastic hollow profiles may also be extruded in one piece or blowmolded in one piece and/or sequentially blowmolded or sequentially extruded and placed in a mold before the first solidification, in which they cool in the desired final shape.

Figure 8:
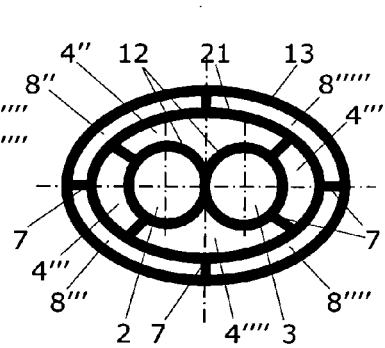
FIG. 8 shows a stable cross-section through the flow, return, and ventilation lines of a line system according to the present invention, according to a fifth embodiment.

FIG. 8 shows a cross-section through the flow, return, and ventilation lines of a line system according to the present invention, according to a fifth embodiment. In contrast to FIGS. 3 through 6, in which the fluid lines 2,3,4 run at least partially coaxially to the peripheral scavenging line 8, the two central fluid lines 2,3 are positioned parallel next to one another here. A ventilation line 4, which is also divided by the support webs 7 into four line chambers 4",4"',4"",4""', runs so it encloses these fluid lines 2,3. The fluid lines 2 and 3 are separated from the fluid line 4 by an intermediate wall 21. All fluid lines 2,3,4 of the line system 1, which is implemented as a one-piece plastic hollow profile at least over the section A and comprises a scavenging line 8, are essentially completely enclosed by the scavenging line 8 and/or by its scavenging chambers 8", 8"',8"",8""', which are separated from one another by support webs 7. The support webs 7, which are connected on all sides to the adjoining walls, cause good stability of the plastic hollow profile.

If this plastic hollow profile is to have a planned final shape which deviates strongly from a straight line, either the support webs 7 may be produced at a distance to a particular adjoining wall (cf. FIG. 9), so that the originally linearly extruded hollow profile may be bent into shape (thermoformed) after reheating (e.g., using water vapor, using induction, or using flexible heating mandrels made of metal fabric and the like inserted into the cavities), laid heated in a mold and then allowed to solidify (cooling using coolant water). Alternatively, such plastic hollow profiles may also be extruded in one piece or blowmolded in one piece and placed in a mold before the first solidification, in which they cool in the desired final shape.

Figure 9:
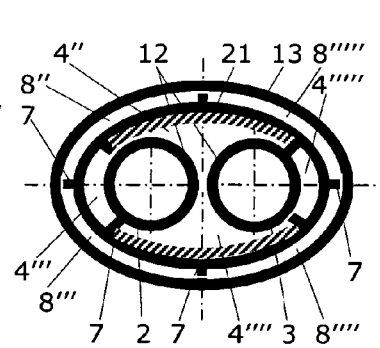
FIG. 9 shows a cross-section, which is flexible on all sides, through the flow, return, and ventilation lines of a line system according to the present invention, according to a sixth embodiment.

FIG. 9 shows a cross-section through the flow, return, and ventilation lines of a line system according to the present invention, according to a sixth embodiment. In contrast to FIG. 8, in which the fluid lines 2,3 are in close-fitting to one another, the two central fluid lines 2,3 are at a distance from one another in this case and all support webs are each only connected to one adjoining wall.

The fluid lines 2,3,4 shown, including the first and second line walls 12,13 as well as the support webs 7 of the plastic hollow profile, are preferably implemented from the same, single-layer polymer material. This simple construction allows cost-effective production of a plastic hollow profile using coextrusion or blowmolding (particularly 3-D blowmolding) and/or sequential blowmolding or sequential extruding.

It is to be noted once again that the outer wall of the plastic hollow profile according to the present invention may also be implemented in at least partially corrugated form, if this is desired for reasons of bending flexibility, for example.

The scavenging line 8 may have at least one additional barrier layer 19 (cf., for example, FIG. 4), which is preferably situated on the inner surface of the second line wall 13 and may also be introduced into the plastic hollow profile through coextrusion. The scavenging line 8 may also have at least one additional adsorption layer 20 (cf., for example, FIG. 4), which comprises filled-in activated carbon or coextruded polyethylene. Alternatively, a fluid line—particularly a ventilation line 4 in a fuel line system for internal combustion engines—may have an additional adsorption layer 20 (cf., for example, FIG. 9), which comprises activated carbon which has been filled in or introduced into the corresponding cavity in another way (e.g., embedded in a net-like textile material incorporated in the plastic hollow profile) or coextruded polyethylene. Notwithstanding the exemplary illustration in FIGS. 4 and 9, if needed, one or more line chambers of a scavenging line 8 or fluid line 4 may be provided with an adsorption layer 20.

Polymer material suitable for producing the plastic hollow profile is to be resistant at least in relation to the fluid conveyed in the fluid lines 2,3,4. It may be of interest for economic reasons to select a polymer material for the production of the plastic hollow profile which is even permeable to the fluids provided to a limited extent. In the second case, however, the condition would be that the scavenging line 8 of the plastic hollow profile is permanently suctioned by partial vacuum and/or flushed using a liquid and/or a gas. The suctioned and/or flushed gas may be trapped in a trapping container suitable for this purpose, such as an activated carbon container (cf. also FIG. 3), or, for example, the hydrocarbon vapors suctioned by the intake system may be combusted directly in the engine as fuel. Due to the existing vapor or gas pressure, this gas moves to the activated carbon filter even without additional flushing and/or when the engine is shut down, as is also the case in the tank bladder of an automobile. A plastic hollow profile according to the present invention is thus especially suitable for fluids having high vapor pressure and permeating properties in relation to plastic. Therefore, environmentally harmful, poisonous, or flammable fluids having volatile components may be transported harmlessly in plastic hollow profiles according to the present invention.

The method disclosed in European Patent EP 0 264 102, according to which an oblong internal plastic pipe, which comprises the fluid lines, is extruded first, is also suitable for the production of the plastic hollow profile according to the present invention, for example. This internal pipe is then supplied continuously to an extrusion molding machine having a transverse main matrix, using which an oblong external plastic pipe having at least two support webs, which run longitudinally and extend radially inward at constant height, is also extruded continuously around this internal pipe. In a downstream calibration matrix unit, the external pipe is drawn together in the still soft state until the free ends of the support webs of the external pipe melt with the outer peripheral surface of the internal pipe (cf. FIGS. 4B, 5B, 7, and 8). If the internal pipe is additionally softened through heating, the final shape for the installation, e.g., in an automobile, may be given to the plastic hollow profile simultaneously with the melting of the external pipe. Plastic hollow profiles produced in this way preferably comprise fluid lines situated concentrically in the scavenging line, the external diameter of the external pipe being able to be 3 to 20 mm at a wall thickness of 0.1 to 2 mm. The external diameter of the internal pipe is preferably 0.2 to 0.9 times the external diameter of the external pipe at a wall thickness of 0.05 to 2 mm. The support webs preferably have a thickness of 0.1 to 1.5 mm. This method is particularly suitable for producing the plastic hollow profile as is shown in FIGS. 2 through 5; in this case, a further envelope is preferably always applied to a pre-extruded plastic hollow profile, so that for the plastic hollow profile shown in FIG. 2, two work steps are necessary (as described in European Patent EP 0 264 102), and three work steps are necessary for the plastic hollow profile shown in FIGS. 3 through 5. If the external pipe is drawn together only partially or not at all after the extrusion, the support webs remain connected to only one adjoining wall and are still separated from the other adjoining wall (cf. FIGS. 4A, 5A, 6A, 6B, and 9).

In particular, molding compounds which are based on polyamides are suitable as a polymer material for the production of the plastic hollow profile according to the present invention. It is preferable in this case for the polyamides for the molding compound of the plastic hollow profile to be selected from a group which comprises PA 6, PA 9T, PA 46, PA 66, PA 69, PA 610, PA 612, PA 1010, PA 1012, PA 11, PA 12, PA 1212, their mixtures, and copolyamides having these components.

Polyamide molding compounds which are based on a polymer mixture made of partially crystalline aliphatic polyamides and partially aromatic polyamides are also very especially suitable for the production of the plastic hollow profile. In this case, the proportion of the aliphatic polyamides is preferably more than 50 wt.-percent, the numeric ratio of the aliphatic carbon atoms to the amide compounds in the aliphatic polyamides being in the range from 8:1 to 12:1. In addition, it is preferable for the partially aromatic polyamides provided in shortage to have further partially aromatic and/or aliphatic amide units in addition to hexamethylenterephthalamide (6T) units and to be predominantly partially crystalline.

To conduct electrostatic charges out of the plastic hollow profile, which may arise through the surface friction of the conveyed fluids, for example, the plastic hollow profile is preferably implemented as electrically conductive (antistatic) and is electrically connected to a ground potential 9. The conductivity is preferably produced in a way known per se by adding electrically conductive fillers to the molding compound, such as carbon black, carbon fibers, graphite fibrils, graphite particles, nanocarbon tubules, metal powder, or metal fibers (particularly steel fibers). Steel fibers additionally provide the plastic hollow profile with increased thermal conductivity.

Further additives known per se for the polyamide molding compounds comprise fillers in the form of layered silicates (phyllosilicates), which provide the nanocomposites thus produced with—in addition to the improved mechanical properties—an improved barrier effect in relation to the permeation of volatile materials. The material produced in this case is a polyamide molding compound having a partially crystalline polyamide and a mineral filler, the mineral filler preferably having an ultrafine grain having a mean particle size of at most 100 nm. Because the exfoliated layered silicates may also have a length of 1000 nm in the longitudinal direction in a synthetic fluoromica, this specification of dimension relates to at least one dimension. The term polyamide is understood to include homopolyamides, copolyamides, and mixtures of homopolyamides and/or copolyamides. Polyamide nanocomposites having aliphatic polyamides and phyllosilicates are especially preferred. In this case, the homopolyamides PA 6, PA 66, PA 46 as well as PA 11 and PA 12 are preferred. Alternatively, mixtures made of partially crystalline polyamides having a component of amorphous polyamide are also conceivable; a component of partially crystalline polyamide is always present in all polyamide nanocomposites produced according to the present invention, however. A preferred example of this variation is a mixture made of partially crystalline PA 66 and amorphous PA 6I/6T, which is obtainable from EMS-Chemie AG (CH-7013 Domat/Ems) under the trade name GRIVORY® GV (glass fiber reinforced).

Organically modified phyllosilicates are preferably used, especially preferably those of the three-layer type (2:1), of which the polyamide molding compound comprises at most 10 wt.-percent. The phyllosilicates (layered silicates) of the three-layer type (2:1) include mica (e.g., muskovite, paragonite, phologopite, biotite, lepidolith, margarite), smektite (montmorillonite, hectorite), and vermiculite, montmorillonite being especially preferred. These are preferably used in organically modified form, so that they may be dispersed in exfoliated form in the polyamide matrix and unfold their maximum effect as nanocomposites.

The fluid lines 2,3,4 and the scavenging line 8 preferably have line ends 16 at their inlet 10 and outlet 11, which are each connected to a connection element 17 of a connection system 18. This connection is to be sealed to the fluid to be conducted and may be produced through welding, for example, through butt welding, rotation welding, friction welding, vibration welding, laser welding, or induction welding, through gluing and/or plugging. Alternatively, the particular connection elements 17 may be molded onto the line ends 16 of the fluid lines 2,3,4 and of the scavenging line 8, e.g., through extrusion coating. Connection elements 17 which are implemented as plugs of a rapid connection system, as is known from European Patent Specification EP 0 635 670, are especially preferred. Such connection elements 17 are preferably also implemented as electrically conductive (antistatic).

Alternately, single or multiple (e.g., each two diametrically opposite) line chambers 3″,3‴,3⁗,3‴″ of arbitrary embodiments may be used as directionally-separate and/or functionally-separate fluid lines. Thus, for example, in FIG. 3, two of the line chambers 3″,3⁗ at a time may be used as a return line 3 and two of the line chambers 3‴,3‴″ at a time may be used as a ventilation line 4. Coolant water may also be conducted in one of the line chambers 3″,3‴,3⁗,3‴″ or in the scavenging line 8.

Within the plastic hollow profile according to the present invention, which is particularly in one piece, an arbitrary number of fluid lines may be provided in arbitrary arrangement and having arbitrary flow direction, as long as the plastic hollow profile comprises a scavenging line 8, which is enclosed by a second line wall 13 and comprises one or more scavenging chambers 8', 8" separated from one another by support webs 7, whose totality at least essentially encloses the fluid lines 2, 3, 4.

The reference numbers in the different figures indicate identical or corresponding elements in each case; this is true even when these elements are not expressly noted in the text. The elements in FIGS. 4 through 9 may be exchanged with one another practically arbitrarily in the scope of the present invention. In particular, the support webs 7 may—depending on the desired spatial flexibility of the plastic hollow profile—be connected at specific points to an adjoining wall or to both adjoining walls. Depending on the desired ability to deform the plastic hollow profile, the additional adsorption layers 20 may also be situated in such a way that they obstruct the bending of the profile in specific directions less. These support webs 7 and/or adsorption layers 20 may also be used for additional three-dimensional stabilization of a plastic hollow profile, however.

What is claimed is:

1. A line system for fluids having volatile components, which comprises at least one fluid line, each having a separate inlet and outlet, the fluid lines being enclosed by a first line wall and extending jointly over a section (A) of the line system close-fitting to one another, but being separated from one another at least by the first line wall over the entire length of the fluid lines, the line system being implemented as a plastic hollow profile at least over the section (A) and comprising a further fluid line, which is enclosed by a second line wall, and comprises one or more line chambers, which are at least partially separated from one another by support webs, whose totality at least essentially encloses the fluid lines, and the first and second line walls and the support webs of the plastic hollow profile being implemented from the same polymer material, wherein the further fluid line is implemented as a scavenging line having scavenging chambers and is connected to a scavenging device, which is implemented for flushing or suctioning the scavenging line and therefore for conveying away and collecting permeates originating from the fluid lines.

2. The line system according to claim 1, wherein the first and second line walls and the support webs of the plastic hollow profile are implemented as a single-layered.

3. The line system according to claim 1, wherein the device for flushing or suctioning the scavenging line is a partial vacuum source connected to the outlet of the scavenging line or an overpressure source connected to the inlet of the scavenging line.

4. The line system according to claim 1, wherein the inlet of the scavenging line is connected to an absorbing unit, which at least temporarily bypasses and/or buffers a suction unit situated at the outlet of the scavenging line in order to capture permeate vapors.

5. The line system according to claim 1, wherein the scavenging line of the plastic hollow profile is permanently suctioned by partial vacuum and/or flushed using a liquid and/or a gas.

6. The line system according to claim 1, wherein the plastic hollow profile is implemented as a fuel line system for internal combustion engines, the fluid lines comprising at least one line which is selected from a group comprising flow lines, return lines, and ventilation lines.

7. The line system according to claim 6, wherein this plastic hollow profile is situated between a fuel container and an internal combustion engine of a motor vehicle, particularly between a fuel tank and an internal combustion engine of an automobile.

8. The line system according to claim 7, wherein the scavenging line is implemented as a ventilation line, which connects the fuel tank to the intake system of the engine.

9. The line system according to claim 1, wherein the plastic hollow profile is implemented as a fuel line system leading to and/or from a fuel tank, the fluid lines comprising at least one line which is selected from a group comprising transport lines, filling lines, tapping lines, and ventilation lines.

10. The line system according to claim 2, wherein the polymer material of the plastic hollow profile is resistant and limitedly permeable in relation to the fluid conveyed in the fluid lines, the fluid being selected from a group which comprises gasoline, diesel, ethanol, methanol, methane, and hydrogen.

11. The line system according to claim 1, wherein the fluid lines and the scavenging line are situated one inside another or next to one another, preferably coaxially one inside another or parallel next to one another.

12. The line system according to claim 1, wherein the plastic hollow profile having fluid lines, scavenging line, and support webs is a one-piece extruded plastic hollow profile or a one-piece blowmolded plastic hollow profile.

13. The line system according to claim 1, wherein the plastic hollow profile is composed of one or more one-piece pre-extruded fluid lines and an external scavenging line, preferably applied in an extrusion molding machine having a transverse main matrix to the pre-extruded fluid lines, having support webs, which has been drawn together in the still warm state in a calibration matrix unit until the support webs are melted with the first line wall of the pre-extruded fluid lines.

14. The line system according to claim 1, wherein the plastic hollow profile is implemented as electrically conductive by adding electrically conductive fillers to the molding compound, which are selected from a group which comprises carbon black, carbon fibers, graphite fibrils, graphite particles, nanocarbon tubules, metal powder, metal fibers, and steel fibers and is electrically connectable to a ground potential.

15. The line system according to claim 1, wherein the fluid lines and the scavenging line have line ends at their inlet and outlet, which are each connected to a connection element of a connection system.

16. The line system according to claim 15, wherein the line ends are connected to the particular connection elements to form a seal, preferably welded or glued.

17. The line system according to claim 15, wherein the particular connection elements are molded onto the line ends of the fluid lines and the scavenging line.

18. The line system according to claim 15, wherein the connection elements are implemented as plugs of a rapid connection system.

19. The line system according to claim 15, wherein the connection elements are implemented as electrically conductive by adding electrically conductive fillers to the molding compound, which are selected from a group which comprises carbon black, carbon fibers, graphite fibrils, graphite particles, nanocarbon tubules, metal powder, metal fibers, and steel fibers.

20. The line system according to claim 1, wherein the plastic hollow profile is based on molding compounds based on polyamides.

21. The line system according to claim 20, wherein the polyamides for the molding compound of the plastic hollow profile are selected from a group which comprises PA 6, PA 9T, PA 46, PA 66, PA 69, PA 610, PA 612, PA 1010, PA 1012, PA 11, PA 12, PA 1212, their mixtures, and copolyamides having these components.

22. The line system according to claim 20, wherein the polyamide molding compound for the plastic hollow profile is based on a polymer mixture made of partially crystalline aliphatic polyamides and partially aromatic polyamides, the proportion of the aliphatic polyamides preferably being greater than 50 wt.-percent, the numeric ratio of the aliphatic carbon atoms to the amide compounds in the aliphatic polyamides being in the range from 8:1 to 12:1, and the partially aromatic polyamides provided in shortage having further partially aromatic and/or aliphatic amide units in addition to hexamethylenterephthalamide (6T) units and being predominantly partially crystalline.

23. The line system according to claim 20, wherein the molding compound for the plastic hollow profile is a polyamide nanocomposite having layered silicates.

24. The line system according to claim 1, wherein the scavenging line has at least one additional barrier layer.

25. The line system according to claim 1, wherein the scavenging line has at least one additional adsorption layer.

26. The line system according to claim 25, wherein the adsorption layer comprises activated carbon or polyethylene.

27. A use of a line system according claim 1, wherein the plastic hollow profile is mounted as a supply line or drain line of a tank facility for fluids having volatile components which is mobile, buried, or installed in a building.

28. A use of a line system according to claim 1, wherein the plastic hollow profile is mounted as a fuel line between a fuel container and an internal combustion engine, particularly between the fuel tank and the engine of an automobile.

29. The line system according to claim 1, wherein said second line wall is an external line wall of said line system.

* * * * *